United States Patent
Lahner

(10) Patent No.: US 11,254,217 B2
(45) Date of Patent: Feb. 22, 2022

(54) MANUAL AND INDIVIDUAL CONFIGURATION OF A RECUPERATION BEHAVIOR

(71) Applicant: Bayerische Motoren Werke Aktiengesellschaft, Munich (DE)

(72) Inventor: Markus Lahner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 127 days.

(21) Appl. No.: 16/676,547

(22) Filed: Nov. 7, 2019

(65) Prior Publication Data
US 2020/0070663 A1 Mar. 5, 2020

Related U.S. Application Data

(63) Continuation of application No. PCT/EP2018/061829, filed on May 8, 2018.

(30) Foreign Application Priority Data

May 8, 2017 (DE) .................. 10 2017 207 719.0

(51) Int. Cl.
  *B60L 7/18* (2006.01)
(52) U.S. Cl.
  CPC ..................... *B60L 7/18* (2013.01)
(58) Field of Classification Search
  None
  See application file for complete search history.

(56) References Cited

U.S. PATENT DOCUMENTS

| | | | | |
|---|---|---|---|---|
| 2002/0177504 A1* | 11/2002 | Pels | ........ | B60K 6/387 477/3 |
| 2013/0197714 A1* | 8/2013 | Remlinger | ...... | B60W 30/18127 701/1 |
| 2013/0197765 A1* | 8/2013 | Schmidt | ........ | B60W 10/06 701/48 |
| 2014/0361607 A1 | 12/2014 | Marx | | |
| 2016/0243945 A1* | 8/2016 | Zinner | ........ | B60L 15/2009 |

(Continued)

FOREIGN PATENT DOCUMENTS

| | | | |
|---|---|---|---|
| DE | 10 2006 033 930 A1 | 1/2008 | |
| DE | 102008061821 A1 * | 6/2010 | ......... B60T 13/586 |

(Continued)

OTHER PUBLICATIONS

International Search Report (PCT/ISA/210) issued in PCT Application No. PCT/EP2018/061829 dated Aug. 20, 2018 with English translation(six pages).

(Continued)

*Primary Examiner* — Peter D Nolan
*Assistant Examiner* — Demetra R Smith-Stewart
(74) *Attorney, Agent, or Firm* — Crowell & Moring LLP

(57) ABSTRACT

A method for manually and individually configuring a recuperation behavior of an electrically driven vehicle includes the manual setting of the recuperation behavior. The manual setting of the recuperation behavior includes both setting a recuperation intensity and setting a recuperation delay. Accordingly, it is possible to manually meter the braking torque such that both a pleasant driving sensation as well as a situation-specific energy recovery is achieved.

17 Claims, 1 Drawing Sheet

(56) References Cited

U.S. PATENT DOCUMENTS

2017/0096071 A1* 4/2017 Schiele ................... B60L 7/14
2019/0308638 A1* 10/2019 Ritter .............. B60W 30/18072

FOREIGN PATENT DOCUMENTS

| DE | 10 2010 004 846 A1 | 3/2011 |
|----|--------------------|--------|
| DE | 10 2011 085 347 A1 | 5/2013 |
| DE | 10 2011 121 748 A1 | 6/2013 |
| DE | 10 2013 211 716 A1 | 12/2014 |
| DE | 10 2014 207 066 A1 | 10/2015 |
| JP | 5176307 B2 | 4/2013 |
| WO | WO 2012/156037 A2 | 11/2012 |

OTHER PUBLICATIONS

German-language Written Opinion (PCT/ISA/237) issued in PCT Application No. PCT/EP2018/061829 dated Aug. 20, 2018 (seven pages).

German-language Search Report issued in counterpart German Application No. 10 2017 207 719.0 dated Jun. 9, 2017 with partial English translation (10 pages).

Cover page of EP 2 709 872 A1 published on Mar. 26, 2014 (one page).

* cited by examiner

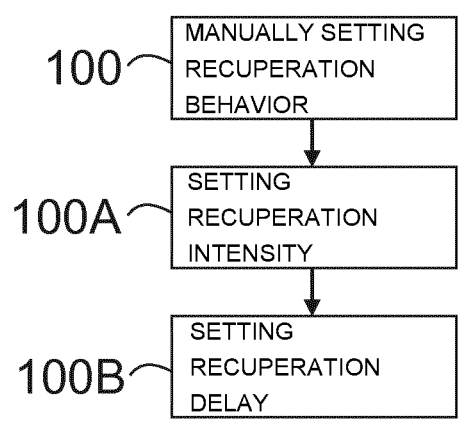

MANUAL AND INDIVIDUAL CONFIGURATION OF A RECUPERATION BEHAVIOR

CROSS REFERENCE TO RELATED APPLICATIONS

This application is a continuation of PCT International Application No. PCT/EP2018/061829, filed May 8, 2018, which claims priority under 35 U.S.C. § 119 from German Patent Application No. 10 2017 207 719.0, filed May 8, 2017, the entire disclosures of which are herein expressly incorporated by reference.

BACKGROUND AND SUMMARY OF THE INVENTION

The invention relates to a method for configuring a recuperation behavior, that is to say the recuperation parameters, wherein it is possible to manually meter the braking torque in such a manner that both a pleasant driving experience and situation-specific energy recovery are established. The present invention also relates to an accordingly configured apparatus, as well as a computer program product with control instructions which implement the method or operate the proposed apparatus.

EP 2 709 872 A2 discloses a recuperation torque which is dependent on a driving style of the driver. This can be manually predefined by the driver (for example sporty or not sporty), for example.

DE 10 2011 085 347 A1 discloses a determination of the recuperation degree by means of a mathematical model which takes into account the current vehicle state, at least one current environmental condition and at least one future environmental condition. It is also shown that the driver is forced to manually make the changes in order to save energy.

DE 10 2006 033 930 A1 describes that, through the knowledge of the characteristic variable of an elevation profile of the route, the duration and intensity of operation (for example recuperation) and electromotive operation can be pre-selected in such a manner that it is possible to use favorable charging and discharging conditions or a favorable number of charging and discharging cycles for the service life of the electrical energy store.

DE 10 2014 207 065 A1 discloses a method comprising the determination of a particular level of the recuperation delay and the detection of a vehicle in front on a road in front of the first vehicle.

The prior art also shows recuperation on the basis of traffic conditions, but the recuperation severely and abruptly decelerates the vehicle, which is possibly not desired by the driver at all and rather could surprise him. If the vehicle should roll again, the recuperation operation should be aborted and no more energy is generated.

According to known methods, the form of recuperation cannot be sufficiently set. Although a mode can generally be selected, this is typically based only on the braking torque per se.

The delay caused by recuperation is therefore sometimes adapted too strongly or not adapted to the driving situation. Excessively strong recuperation is in this case an increased risk as a result of locking of the tires.

An object of the present invention is to provide an improved method for configuring a recuperation behavior which is both safe and comfortable with respect to the driving behavior. An object of the present invention is also to provide an accordingly configured apparatus and to provide a computer program product with control instructions which implement the method or at least partially operate the proposed apparatus.

Accordingly, a method for manually and individually configuring a recuperation behavior of an electrically operated vehicle is provided, comprising manually setting the recuperation behavior, wherein the manual setting of the recuperation behavior comprises both setting a recuperation intensity and setting a recuperation delay.

Aspects are partially described below with reference to electrically operated vehicles, but this should not be interpreted as restrictive. In this respect, motor vehicles are generally developed further according to the invention. Any motor vehicle is generally possible as the motor vehicle in this case, in particular an automobile or a motorcycle. However, the present invention can be particularly preferably also used in motor vehicles with a hybrid drive.

The object is also achieved by means of an apparatus for manually and individually configuring a recuperation behavior of an electrically operated vehicle, having a setting unit configured to manually set the recuperation behavior, wherein both a device configured to set a recuperation intensity and a device configured to set a recuperation delay are provided for manually setting the recuperation behavior.

The object is also achieved by means of a computer program product with control instructions which carry out the method and operate the proposed arrangement when executed on a computer.

According to the invention, it is particularly advantageous that the method can be used to operate the proposed apparatuses and units. The proposed apparatuses and devices are also suitable for carrying out the method according to the invention. The apparatus therefore respectively implements structural features which are suitable for carrying out the corresponding method. However, the structural features may also be in the form of method steps. The proposed method also keeps available steps for implementing the function of the structural features.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic flowchart of an exemplary method for manual and individual configuration according to one aspect of the present invention.

DETAILED DESCRIPTION OF THE DRAWING

FIG. 1 shows a flowchart of a method for manually and individually configuring a recuperation behavior of an electrically operated vehicle. The method includes manual setting 100 of the recuperation behavior, wherein the manual setting 100 of the recuperation behavior comprises both setting 100A a recuperation intensity and setting 100B a recuperation delay. In this case, a person skilled in the art recognizes that the steps may have further substeps and, in particular, that the method steps can each be carried out iteratively and/or in another order.

Accordingly, manual and individual configuration of a recuperation behavior are provided in such a manner that the control of recuperation is always the responsibility of the driver. Therefore, recuperation is not automatically adjusted, but rather the driver discovers appropriate settings or makes them himself and can then configure the recuperation at his own discretion. Therefore, an advantage of the present invention is that the configuration is carried out manually and the driver is not ignored in such a manner that a driving behavior which possibly has a risk potential is imposed on him.

The invention overcomes the disadvantage of the prior art of a particular braking torque occurring during recuperation, which therefore cannot be predicted by the driver. For example, the driver of a motor vehicle is not accustomed to such a braking torque and in this case can lose control of his vehicle, for example on an ultra-smooth or slick road. This is the case, in particular, because braking systems which are based on recuperation have a different braking behavior than conventional braking systems. This often at least results in the driver noticing an unusual driving behavior and therefore being distracted by the corresponding braking torque. This need not necessarily be safety-critical, but may at least result in an unwanted driving experience of the driver and should therefore be avoided.

One advantage of the present invention is that all parameters of recuperation can be manually set. Provision is therefore not only made for a recuperation intensity to be settable, but rather also for a recuperation delay to be individually adaptable. A recuperation behavior of an electrically driven vehicle is therefore manually and individually configured. An electrically operated or driven vehicle may also be in the form of a hybrid vehicle which has a corresponding recuperation system.

The invention overcomes the disadvantage that only the recuperation intensity can typically be set and this is typically also not carried out manually. According to the invention, a recuperation delay is set in such a manner that a conventional braking system first of all decelerates the vehicle in a conventional manner and triggers recuperation only after the recuperation delay has elapsed.

Therefore, here, the recuperation delay does not relate to the deceleration behavior of the vehicle, as a result of which the speed of the vehicle is decelerated, but rather a recuperation delay in the context of the present invention means that a conventional braking system initiates a braking operation and a recuperation operation takes place only after the individually configured recuperation delay has elapsed. Therefore, the recuperation delay corresponds to a period of time which can possibly also comprise a distance. For example, it is possible to set the situation in which conventional braking is carried out for the first 10 to 30 meters of a braking operation and the recuperation operation starts only after this distance.

It is therefore possible for a driver to always use a conventional braking system, to which he is also thus accustomed, during braking. The recuperation is switched on and the corresponding braking torque is applied only after the recuperation delay has elapsed. The braking operation is therefore initiated in a conventional manner, which is particularly safe for inexperienced drivers since the behavior of the braking system can be estimated better than a recuperation behavior.

A recuperation behavior is understood as meaning, in particular, aspects of the recuperation intensity and the recuperation delay. A recuperation intensity corresponds to the braking torque or the recovered energy according to a braking behavior based on recuperation. The recuperation intensity is therefore used to set how firmly the vehicle brakes and therefore also how abruptly and suddenly the braking operation is carried out. In the case of a higher recuperation intensity, a higher braking torque is also effected and the driver feels a jolt since the vehicle is suddenly decelerated. This is not only dangerous in road traffic, but also reduces the driving comfort of the driver.

The driver can individually and manually set the recuperation delay in such a manner that the braking effect is no longer achieved by the conventional braking system but rather by recuperation, for example only after 5 seconds of a braking operation. The driver therefore has a driving experience which is expected by the driver, and the disadvantages of recuperation are overcome according to the invention.

In particular, it is advantageous that both the recuperation intensity and the recuperation delay can be adapted. These two parameters and their individual setting interact synergistically since the recuperation behavior is substantially influenced by these two parameters. In the case of a high recuperation delay for example, it is therefore possible to use a high recuperation intensity since the vehicle has already been decelerated and accordingly no sudden deceleration is produced either in the case of a high recuperation intensity. This overcomes the disadvantage that the prior art deals only with the recuperation intensity and disregards a recuperation delay. In particular, the combination of both parameters, namely the recuperation intensity and the recuperation delay, is particularly advantageous since a braking behavior can also be set here in such a manner that the fact that recuperation takes place remains hidden to the driver.

The energy recovery can therefore be individually set according to the invention and therefore corresponding recuperation methods are more highly accepted by the driver. When also purchasing an electrically driven vehicle, the driver is therefore not surprised by the new recuperation technology, but rather it is possible to suppress the noticeable effects which physically affect the driver by means of the individual settings. According to the invention, it is also possible for each driver to adapt a corresponding recuperation behavior according to his own subjective ideas, and a particularly pleasant driving experience is therefore produced.

In this case, however, it is also possible to consider operating parameters of the vehicle by means of the recuperation intensity and the recuperation delay. For example, it is possible to set that a high recuperation intensity should always be set if the battery has a low state of charge. In this case, it is possible to also reduce the recuperation delay to a certain threshold value, with the result that sufficient energy is always recovered and the battery is accordingly protected. It is therefore also possible, according to the invention, to set the range of the electrically driven vehicle in such a manner that a balance between recuperation which is as high as possible and a driving experience which is as pleasant as possible is produced.

In this case, it is particularly advantageous to be able to offer the driver appropriate configurations which are chosen and are also manually readjusted by the driver. It is possible, for example, for the driver to select a certain mode which carries out recuperation. Such a program can also be configured during the journey by means of corresponding operating elements in such a manner that the recuperation intensity and the recuperation delay are increased or reduced. In this case, a person skilled in the art is aware of appropriate operating elements, for example rocker switches, a lever and/or appropriate buttons. For example, the driver can manipulate the recuperation behavior using buttons on a steering wheel in such a manner that the driver sets certain levels of the recuperation intensity and/or stages of the recuperation delay. The entire recuperation behavior of the vehicle can therefore be individually configured.

It is also possible to consider environmental influences in such a manner that a recuperation delay is implemented in the case of a smooth or wet road. Abrupt deceleration can therefore be avoided, with the result that the vehicle does not lose traction and is decelerated by means of a conventional braking system before recuperation. Existing sensors can also be used for this purpose in order to survey a surface condition of a road. A further safety element is therefore implemented according to the invention and the driver can reduce the recuperation intensity and increase the recuperation delay in the case of a smooth road surface, for example. The recuperation is therefore started later and the braking torque of the recuperation intensity occurs only to a reduced extent.

In this case, it is also possible that the driver wishes to support his own driving style and therefore wishes to be either particularly sporty or particularly comfortable en route. In the case of a sporty driving style, the recuperation can therefore be maximized in such a manner that the recuperation intensity is increased and the recuperation delay is minimized. The driver can therefore individually set how abruptly the vehicle reacts to a braking operation.

The braking operation is generally influenced only in the manner permitted by the corresponding safety system. If hard braking is carried out from a dangerous situation, the recuperation intensity can also be maximized and the recuperation delay can be minimized. If, in contrast, the driver wishes only to comply with a distance to a vehicle driving in front, the recuperation parameters can be determined substantially freely and there is freedom for individually configuring the recuperation.

The driver can select the degree of recuperation from a plurality of levels. According to one aspect of the present invention, the recuperation settings are stored in the driving modes EcoPro, Comfort and Sport and adapt the form of the drive character to the respective driving mode. Optionally, the customer or the driver can select whether the degree of recuperation is intended to be changed, if the driving modes are changed, by configuring the driving modes. Unpleasant and strong recuperation can therefore be sometimes manually set (for example comfort mode). This makes it possible to restrict the safety risk to a smooth surface.

According to one aspect, the setting of the recuperation intensity and the setting of the recuperation delay are carried out independently of one another or in a coupled manner. This has the advantage that corresponding parameters can either be individually and separately configured by the driver or a further value is adapted when manually configuring a value. If the recuperation intensity is increased, for example, the recuperation delay may likewise be increased since the higher intensity enables sufficient energy recovery. The recuperation per se can therefore start later.

According to another aspect, the setting of the recuperation behavior is adapted on the basis of a selected driving mode from a stored plurality of driving modes. This has the advantage that it is possible to react to a sporty driving mode with fast acceleration in such a manner that the recuperation intensity is high and the recuperation delay is low. The fact that the driver in the sporty mode accepts or even desires an abrupt reaction is therefore taken into account. The behavior may accordingly be the reverse in the comfort mode since the driver desires a low braking torque and therefore a low recuperation intensity. Accordingly, the recuperation delay can be increased in this comfort mode.

According to another aspect, a plurality of driving modes are stored in the vehicle and the recuperation behavior continues independently of the selected driving mode. This has the advantage that the driver always finds an expected recuperation behavior and is not surprised by adaptations of the recuperation behavior on account of a changed driving mode. If, for example, a state of charge of a battery is low, a maximum recuperation intensity with a minimum recuperation delay can always be selected independently of the driving mode.

According to another aspect, a recuperation behavior is automatically adapted on the basis of at least one read value from an environmental sensor. This has the advantage that a low recuperation intensity and a maximum recuperation delay can be set, for example in the case of rain, ice or snow, in order to minimize the risk of an accident. If it is detected that there is a skid risk, the braking torque is therefore throttled. An environmental sensor may be a moisture sensor, a temperature sensor and/or an optical sensor. Such a sensor system is preferably configured to detect the road conditions.

According to another aspect, different recuperation behaviors are proposed for selection on the basis of at least one read value from the environmental sensor. This has the advantage that stored parameters of a plurality of recuperation scenarios can be selected and used in a situation-specific manner. For example, a manufacturer can evaluate a plurality of configurations in a test under test conditions and a corresponding program can be selected depending on the road conditions. The recuperation behaviors are proactively proposed for selection, for example, that is to say if the method according to the invention detects a particular driving style or environmental conditions.

According to another aspect, different combinations of recuperation intensities and recuperation delays are proposed to the driver for selection. This has the advantage that recuperation behaviors can also be selected independently of a read value from the environmental sensor. Individual driving programs can therefore be suggested to the driver, from which the driver can choose in a situation-specific manner or simply according to his own subjective feeling.

According to another aspect, a plurality of recuperation modes are stored, from which the driver can manually choose. This has the advantage that combinations of recuperation intensities and recuperation delays can be geared specifically to the recuperation per se and not only to the driving behavior. It is thus possible to specify that maximum recuperation is effected, wherein high recuperation intensities and low recuperation delays can be combined. It is also possible to generally deactivate the recuperation or to at least set the recuperation intensity to a minimum and the recuperation delay to a maximum. The driver can therefore deliberately influence the recuperation per se and receives assistance through stored modes.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for manually and individually configuring a recuperation behavior of an electrically driven vehicle, comprising:

manually setting the recuperation behavior, wherein the manual setting of the recuperation behavior comprises both setting a recuperation intensity and setting a recuperation delay, and different combinations of recuperation intensities and recuperation delays are proposed to a driver for selection.

2. The method according to claim 1, wherein
the setting of the recuperation intensity and the setting of the recuperation delay are carried out independently of one another.

3. The method according to claim 1, wherein
the setting of the recuperation behavior is adapted on the basis of a selected driving mode from a stored plurality of driving modes.

4. The method according to claim 1, wherein
a plurality of driving modes are stored in the vehicle and the recuperation behavior continues independently of the selected driving mode.

5. The method according to claim 1, wherein
the recuperation behavior is automatically adapted on the basis of at least one read value from an environmental sensor comprising at least one of a moisture sensor, a temperature sensor, an optical sensor, or a road condition sensor configured to detect a surface condition of a road.

6. The method according to claim 5, wherein
different recuperation behaviors are proposed for selection on the basis of at least one read value from the environmental sensor.

7. The method according to claim 1, wherein
a plurality of recuperation modes are stored, from which a driver can manually choose.

8. The method according to claim 1, wherein
a recuperation operation takes place only after initiating braking operation and the recuperation delay has elapsed.

9. An apparatus for manually and individually configuring a recuperation behavior of an electrically driven vehicle, comprising:

a setting unit configured to manually set the recuperation behavior, wherein the setting unit comprises both:

a device configured to set a recuperation intensity, and a further device configured to set a recuperation delay are provided for manually setting the recuperation behavior, wherein different combinations of recuperation intensities and recuperation delays are proposed to a driver for selection.

10. The method according to claim 9, wherein
a recuperation operation takes place only after initiating braking operation and the recuperation delay has elapsed.

11. A computer product comprising a non-transitory computer readable medium having stored thereon control instructions that, when executed, carry out:

manually setting of a recuperation behavior, wherein
on the manual setting of the recuperation behavior comprises both setting a recuperation intensity and setting a recuperation delay, and different combinations of recuperation intensities and recuperation delays are proposed to a driver for selection.

12. The computer product according to claim 11, wherein
the setting of the recuperation intensity and the setting of the recuperation delay are carried out independently of one another.

13. The computer product according to claim 11, wherein
the setting of the recuperation behavior is adapted on the basis of a selected driving mode from a stored plurality of driving modes.

14. The computer product according to claim 11, wherein
a plurality of driving modes are stored in the vehicle and the recuperation behavior continues independently of the selected driving mode.

15. The computer product according to claim 11, wherein
the recuperation behavior is automatically adapted on the basis of at least one read value from an environmental sensor comprising at least one of a moisture sensor, a temperature sensor, an optical sensor, or road condition sensor configured to detect a surface condition of a road.

16. The computer product according to claim 15, wherein
different recuperation behaviors are proposed for selection on the basis of at least one read value from the environmental sensor.

17. The computer product according to claim 11, wherein
a plurality of recuperation modes are stored, from which driver can manually choose.

* * * * *